United States Patent
Chen (10) Patent No.: US 10,371,317 B2
(45) Date of Patent: Aug. 6, 2019

(54) QUICK LOCKING DEVICE (71) Applicant: Xiaoming Chen, Richmond Hill (CA)

(72) Inventor: Xiaoming Chen, Richmond Hill (CA)

(*) Notice: Subject to any disclaimer, the term of this patent is extended or adjusted under 35 U.S.C. 154(b) by 0 days.

(21) Appl. No.: 15/957,334

(22) Filed: Apr. 19, 2018

(65) Prior Publication Data

US 2019/0162362 A1 May 30, 2019

(30) Foreign Application Priority Data

Nov. 24, 2017 (CN) .................... 2017 2 1602343 U (51) Int. Cl.
*F16M 13/02* (2006.01)
*F16B 2/18* (2006.01)

(52) U.S. Cl.
CPC ........... *F16M 13/022* (2013.01); *F16B 2/185* (2013.01); *F16M 2200/027* (2013.01)

(58) Field of Classification Search
CPC .. F16M 13/022; F16M 2200/027; F16B 2/185
USPC ... 248/357, 177.1, 371, 178.1, 179.1, 184.1, 248/183.4, 317, 323, 324
See application file for complete search history.

(56) References Cited

U.S. PATENT DOCUMENTS

| | | | | |
|---|---|---|---|---|
| 4,525,052 A * | 6/1985 | Kosugi | ................ | F16M 11/041 248/177.1 |
| 6,435,738 B1 * | 8/2002 | Vogt | .................... | F16M 11/041 396/419 |
| 6,773,172 B1 * | 8/2004 | Johnson | ............... | F16M 11/041 248/187.1 |
| 7,185,862 B1 * | 3/2007 | Yang | .................... | F16M 11/041 248/187.1 |
| 7,658,556 B2 * | 2/2010 | Johnson | ................ | F16M 11/02 396/428 |
| 8,256,726 B2 * | 9/2012 | Bordignon | ............... | F16M 1/04 248/177.1 |
| 2005/0041966 A1 * | 2/2005 | Johnson | ............... | F16M 11/041 396/428 |
| 2005/0267600 A1 * | 12/2005 | Haberman | ................ | A61F 2/76 623/38 |
| 2006/0239677 A1 * | 10/2006 | Friedrich | ............. | F16M 11/043 396/419 |
| 2008/0006747 A1 * | 1/2008 | Bobro | ..................... | F41A 23/10 248/178.1 |
| 2013/0058639 A1 * | 3/2013 | Galik | ................... | F16M 11/045 396/428 |

(Continued)

*Primary Examiner* — Muhammad Ijaz
(74) *Attorney, Agent, or Firm* — Vivacqua Law, PLLC (57) ABSTRACT

A quick locking device having a fixing mount; a fixed pressing groove and a movable pressing groove arranged opposite thereto on the fixing mount; a pulling rod connected to the fixed pressing groove and the movable pressing groove, so as to adjust the opening and closing of the movable pressing groove; a pivot shaft; a cam lever pivotally connected to the pulling rod through the pivot shaft, so as to adjust the opening or closing distance between the fixed pressing groove and the movable pressing groove; and a rotational positioning locking mechanism installed in the cam lever, wherein the rotational positioning locking mechanism comprises a positioning groove formed on the pivot shaft, a positioning member arranged in the cam lever and movably engaged with the positioning groove, and a locking operation member controlling the movement of the positioning member.

9 Claims, 5 Drawing Sheets

(56) References Cited

U.S. PATENT DOCUMENTS

2014/0252187 A1\* 9/2014 Petrovic ............... F16B 2/185
                                                    248/229.16
2018/0259298 A1\* 9/2018 Gao .................... F41G 11/003

\* cited by examiner

QUICK LOCKING DEVICE

CROSS-REFERENCE TO RELATED APPLICATIONS

This application is based on and claims the benefit of priority from Chinese Patent Application No. 201721602343.0, filed on Nov. 24, 2017, the entire contents of which are incorporated by reference.

FIELD

The present disclosure relates to the field of mechanical engineering, and more particularly, to a quick locking device.

BACKGROUND

The statements in this section merely provide background information related to the present disclosure and may or may not constitute prior art.

A quick locking device is widely applied in various mechanical products, such as the connection and fixation between components, the connection and fixation of supporting frames, etc. The existing mechanical connection is usually utilized as an assembly of two components through a screw, a snap joint, and other structures. However, the traditional connection is relatively inconvenient in locking or loosing, failing to perform a quick locking and unlocking, which brings certain inconvenience to a user.

SUMMARY

A quick locking device is provided according to the present disclosure, which can be quickly disassembled and assembled, convenient and simple to operate, easier in usage, with higher reliability and portability.

According to one aspect of the present disclosure, a quick locking device is provided, which comprises a fixing mount; a fixed pressing groove and a movable pressing groove arranged opposite to the fixed pressing groove on the fixing mount; a pulling rod connected to the fixed pressing groove and the movable pressing groove, so as to adjust the opening and closing of the movable pressing groove; a pivot shaft; a cam lever pivotally connected to the pulling rod through the pivot shaft, wherein the rotation of the cam lever drives the pulling rod to move in an axial direction along its length, the pulling rod in turns drives the movable pressing groove to move oppositely to the fixed pressing groove, so as to adjust the opening or closing distance between the fixed pressing groove and the movable pressing groove; and a rotational positioning locking mechanism installed in the cam lever, wherein the rotational positioning locking mechanism comprises a positioning groove formed on the pivot shaft, a positioning member arranged in the cam lever and movably engaged with the positioning groove, and a locking operation member controlling the movement of the positioning member.

The fixed pressing groove and the movable pressing groove are installed oppositely and together formed as a locking mechanism. The cam lever and the pulling rod are used to adjust the opening and closing distance between the fixed pressing groove and the movable pressing groove. When locking is needed, it is only necessary to pull the cam lever, and then the cam lever can drive the movable pressing groove to move, so as to easily realize locking; and when the unlocking is needed, it is only necessary to press the locking operation member, and pull the cam lever subsequently or at the same time, then the cam lever can drive the movable pressing groove to move, so as to easily realize unlocking. The operation is simple and quick, and the efficiency of the locking device is obviously increased. The quick locking device described in the present disclosure can be universalized and standardized by only setting a locking guide rail matched with the quick locking device in a component to be locked, which simplifies the connecting structure of each component. Moreover, the quick locking device may be an independent part, and used repeatedly.

Further areas of applicability will become apparent from the description provided herein. It should be understood that the description and specific examples are intended for purposes of illustration only and are not intended to limit the scope of the present disclosure.

DRAWINGS

The present disclosure is further described hereinafter with reference to the drawings and the embodiments.

In the drawings, the same numeral reference indicates the same part.

DETAILED DESCRIPTION

The following description is merely exemplary in nature and is not intended to limit the present disclosure, application, or uses.

FIG. 1 to FIG. 5 refer to an embodiment of a quick locking device according to the present disclosure, which comprises a fixing mount 1, and the fixing mount 1 is provided with a fixed pressing groove 2 and a movable pressing groove 3 arranged opposite to the fixed pressing groove 2. In the embodiment, in order to realize the movement of the movable pressing groove 3, the following structure may be adopted: the fixing mount 1 is provided with a hinge groove 11 for connecting the movable pressing groove 3, the section of the hinge groove 11 is designed as a circle with a gap, the movable pressing groove 3 is provided with a spindle 12 arranged in the hinge groove 11 so that the movable pressing groove 3 can swing around the hinge groove 11 through the spindle 12 when the movable pressing groove 3 is driven by a pulling rod 4.

A pulling rod 4 is connected to the fixed pressing groove 2 and the movable pressing groove 3 to adjust the opening and closing of the movable pressing groove, the pulling rod 4 is also connected to a pivot shaft 5, and the pivot shaft 5 is sleeved in an installation hole of a cam lever 6. When the cam lever 6 is operated, it can rotate around the pivot shaft 5. Because of the curvature change along the curved surface of the cam lever 6, the distance between the center of circle of the pivot shaft 5 and the curved surface varies with the curvature change, so that when the cam lever 6 is operated to rotate, the pulling rod 4 is driven to move in an axial direction, and the pulling rod 4 drives the movable pressing groove 3 to swing about the hinge groove 11 through the spindle 12, so as to adjust the opening or closing distance between the fixed pressing groove 2 and the movable pressing groove 3 to realize locking or loosing. A locking guide rail 8 can be adapted to the locking groove formed by the fixed pressing groove 2 and the movable pressing groove 3, and the locking guide rail 8 can be a Picatinny rail or a trapezoid rail.

In order to allow the movable pressing groove 3 to be automatically opened to the maximum position during unlocking to facilitate separation of the device from the locking guide rail 8, in the embodiment, a reset spring 7 may be arranged between the movable pressing groove 3 and the fixing mount 1. Under the effect of the reset spring 7, the movable pressing groove 3 stay in an opening state. When the movable pressing groove 3 is pulled by the pulling rod 4, the movable pressing groove 3 overcomes the elastic force of the reset spring 7 to move close to the fixed pressing groove 2, so as to realize locking; and after the pulling rod 4 relieves the force implemented to the movable pressing groove 3, the movable pressing groove 3 swings and opens under the effect of the reset spring 7, and the distance from the fixed pressing groove 2 increases, so as to allow the device to be disengage from the locking guide rail 8.

In order to prevent the locking device from loosening in a locking state by collision, component fatigue, and other reasons, and prevent the cam lever 6 from loosening whereby leading to failure of locking, the quick locking device is provided with a rotational positioning locking mechanism. The rotational positioning locking mechanism comprises a positioning groove 51 arranged on the pivot shaft 5, a movable positioning member 61 arranged in the cam lever 6, and a locking operation member 62. The locking operation member 62 is provided with an accommodating groove 621 for containing the positioning member 61. The locking operation member 62 is configured to push and keep the positioning member 61 to be clamped in the positioning groove 51, and the positioning groove 51 limits the rotation of the cam lever 6 through the positioning member 61, to realize locking. In addition, when the locking operation member 62 is operated, the positioning member 61 falls in the accommodating groove 621 to be off limited by the positioning groove 51, so that the cam lever 6 can rotate to realize the unlocking. The positioning groove 51 may be a V-shape groove or a groove in different geometrical shapes.

Figure 4:
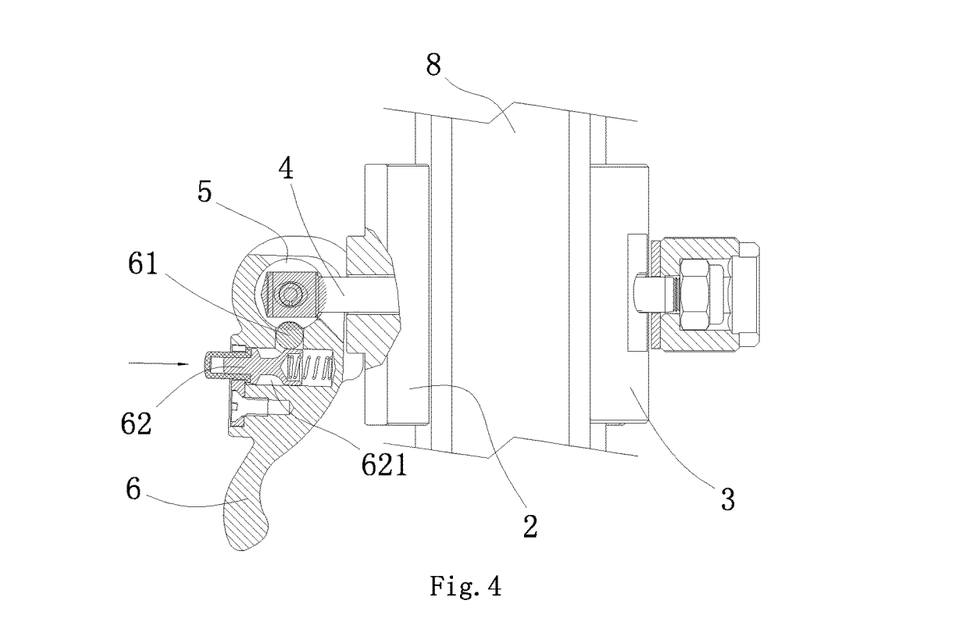
FIG. 4 is a schematic cross-section diagram of FIG. 2, wherein the locking device is in a locking state.
Figure 5:
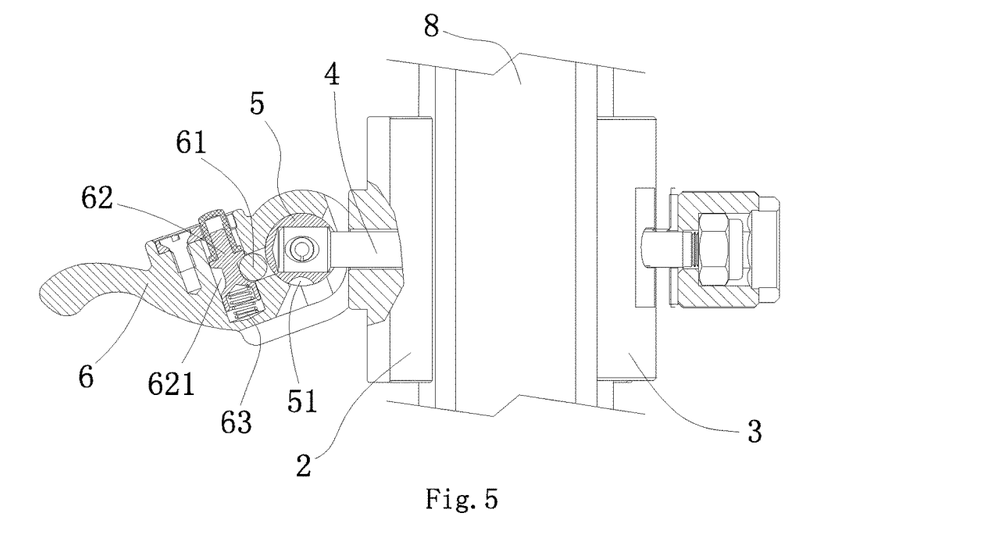
FIG. 5 is a schematic cross-section diagram of FIG. 2, wherein the locking device is in an unlocking state.

With reference to FIGS. 4 and 5, the cam lever 6 is internally provided with a first installation channel for installing, accommodating and allowing the movement of the positioning member 61. One end of the first installation channel is communicated with the pivot shaft 5, and the other end of the first installation channel is communicated with the locking operation member 62, so that the positioning member 61 can be switched under the limitation of the positioning groove 51 and the accommodating groove 621. Therefore, when the cam lever 6 is pulled towards the fixed pressing groove 2, the positioning member 61 is clamped into the positioning groove 51, and the positioning groove 51 limits the rotation of the cam lever 6 to realize locking through the positioning member 61; when the locking operation member 62 is pressed, and the cam lever 6 is pulled away from the fixed pressing groove 2 at the same time, the positioning member 61 can fall into the accommodating groove 621 to off limited by the positioning groove 51, so that the cam lever 6 can rotate to realize the unlocking.

Figure 1:
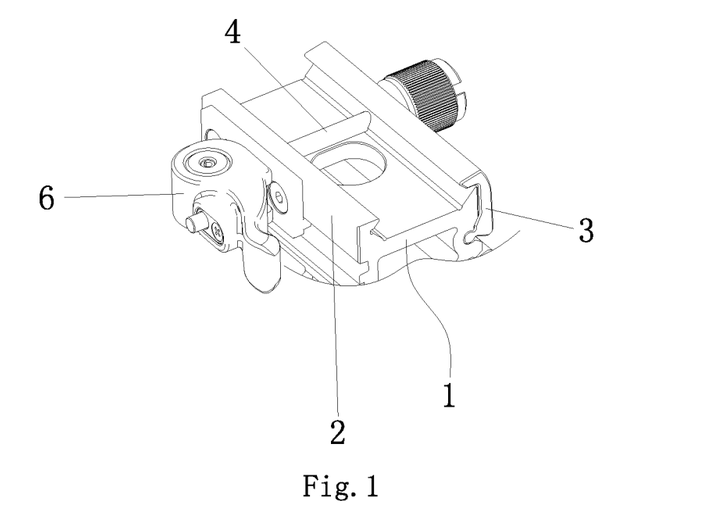
FIG. 1 is a structural schematic diagram of an embodiment of the present disclosure.
Figure 2:
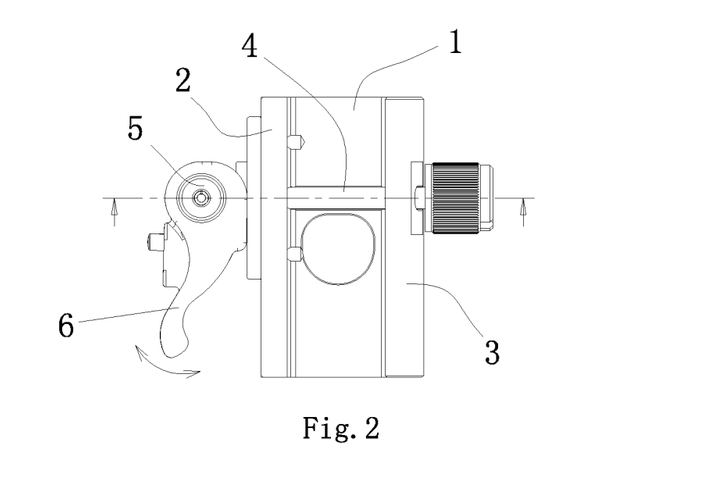
FIG. 2 is a main projection view of an embodiment of the present disclosure.
Figure 3:
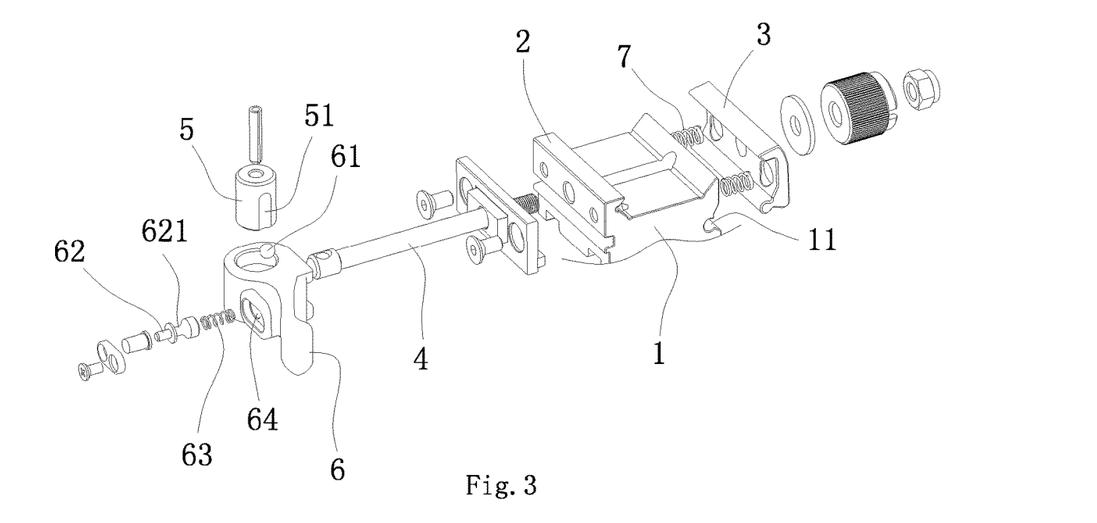
FIG. 3 is an exploded view of the device in FIG. 1.

With reference to FIGS. 3 to 5, in the embodiment, the positioning member 61 may be made as a sphere, or a columnar spherical body, or as an assembly composed of the columnar spherical body and the sphere, when the positioning member 61 is composed of the columnar spherical body and the sphere, one end of the columnar spherical body is matched with the positioning groove 51, and the sphere is butted with the other end of the columnar spherical body, so as to facilitate the movement of the positioning member 61 in the first installation channel. Of course, although the positioning member 61 is shown in the drawing as a sphere, it's contemplated that there may be various structures and geometrical shapes of the positioning member 61, which are not limited to the structure and the shape described above.

The locking operation member 62 has the following functions: the positioning member 61 is pushed to be clamped in the positioning groove 51, so that when the quick locking device needs to be locked, the positioning member 61 can be clamped in and restricted by the positioning groove 51, and guarantee that the cam lever 6 does not rotate under the limitation effect of the positioning member 61. Therefore, in order to realize that the locking operation member 62 has the function of easily pushing the positioning member 61 to be clamped in the positioning groove 51, in the embodiment, one end of the positioning member 61 contacted with the accommodating groove 621 may be in a spherical shape, the side wall of the accommodating groove 621 may be provided as an arc-shaped plane or an inclined plane for pushing the positioning member 61 to move. The arc-shaped plane or the inclined plane are used to push the positioning member 61 to move while the locking operation member 62 is moving, so that the positioning member 61 can be clamped in the positioning groove 51. The structure is simple and reliable, and easy to be implemented.

The locking operation member 62 has further functions as described below. The positioning member 61 is kept to be clamped in the positioning groove 51, so that when the quick locking device is in a locked (clamping) state, the positioning member 61 is always located in the positioning groove 51, which guarantees that the cam lever 6 cannot rotate even under the interference of external force, unless the locking of the positioning groove 51 to the positioning member 61 is relieved thereby the positioning member 61 synchronically relieves the locking on the cam lever 6. Therefore, in the embodiment, one end of the locking operation member 62 is connected to an elastic member 63, and the locking operation member 62 pushes and keeps the positioning member 61 to be clamped in the positioning groove 51 under the effect of the elastic member 63. Wherein, a reset spring may be used as the elastic member 63, however alternatively a rubber member or other structures with elasticity may be used.

The locking operation member 62 has yet further functions as described below. The locking operation member 62 can be operated (specifically refer to pressing in the embodiment) to move, so as to push on the positioning member 61. In order to realize this function, in the embodiment, the cam lever 6 is provided with a second installation channel 64 for installing the locking operation member 62, the locking operation member 62 extends out from the second installation channel 64 to form an operation end for a user. The reset spring is arranged in the second installation channel 64, with one end thereof contacts the bottom of the second installation channel 64, and the other end of the reset spring is butted with the other end of the locking operation member 62 opposite to the operation end.

The operating principle of the quick locking device in the embodiment above is described in detail as follows.

With reference to FIG. 5, the quick locking device is in an unlocking or loosening state as shown. When locking is needed, the cam lever 6 will be operated into the state as shown in FIG. 4, specifically, the positioning member 61 is clamped into the positioning groove 51 and cannot rotate around the pivot shaft 5 relative to the positioning groove 51, whereby the cam lever 6 cannot rotate around the pivot shaft 5 under the restriction of the positioning member 61, and the distance between the fixed pressing groove 2 and the movable pressing groove 3 is fixed to be in a stable clamping state. When disassembly is needed, the locking operation member 62 is pressed, thereby the positioning member 61 falls in the accommodating groove 621, so as to disengage from the positioning groove 51; since the positioning groove 51 relieves the locking on the positioning member 61, the cam lever 6 can now rotate around the pivot shaft 5 into the unlocking state as shown in FIG. 5, meanwhile the distance between the fixed pressing groove 2 and the movable pressing groove 3 is increased, so as to realize the disassembly of the quick locking device from a locking guide rail 8.

According to an embodiment of The present disclosure, and more particularly, with reference to FIG. 4, when locking is needed, the cam lever 6 is pressed down, the positioning member 61 rotates with the cam lever to a position aligned with the positioning groove 51, the reset spring recovers to a released state from a compression state, the locking operation member 62 is pushed by the spring to move in an axial direction, the positioning member 61 is in turn pushed by the side wall of the accommodating groove 621 and moves along the first installation channel to disengage from the accommodating groove 621 and engages with the positioning groove 51, so as to lock the cam lever 6.

With reference to FIG. 5, when unlocking and disengagement of the device is needed, the locking operation member 62 should be pressed, at this moment the positioning member 61 is able to fall in the accommodating groove 621, and the cam lever 6 now can be unlocked and rotated; when the cam lever 6 is rotated, the positioning member 61 is disengaged from the positioning groove 51; the pulling rod is driven by the cam lever 6 and moves along a longitude axis of the pulling rod, so that the distance between the movable pressing groove and the fixed pressing groove can be increased to a maximum, so as to realize the unlocking. Under this state, since the positioning member 61 keeps staying in the accommodating groove 621, it makes the locking operation member 62 displace to and compress the spring.

When a locking state as shown in FIG. 4 is needed, the cam lever 6 should be pressed down, the positioning member 61 will then travel following the cam lever to be aligned with the positioning groove 51; once aligned, the spring relieves from compression and push the locking operation member 62 to move axially, and meanwhile, the positioning member 61 is driven to move to be engaged with the positioning groove 51.

In the embodiment, the pivot shaft 5 is provided with a positioning groove 51 to be used in locking under the position as shown in FIG. 4. When the cam lever 6 is located at the position as shown in FIG. 5, the locking operation member 62 does not need to be operated, the quick locking operation can be done by only pressing down the cam lever 6 or to say, by pulling it toward the fixed pressing groove.

Figure 6:
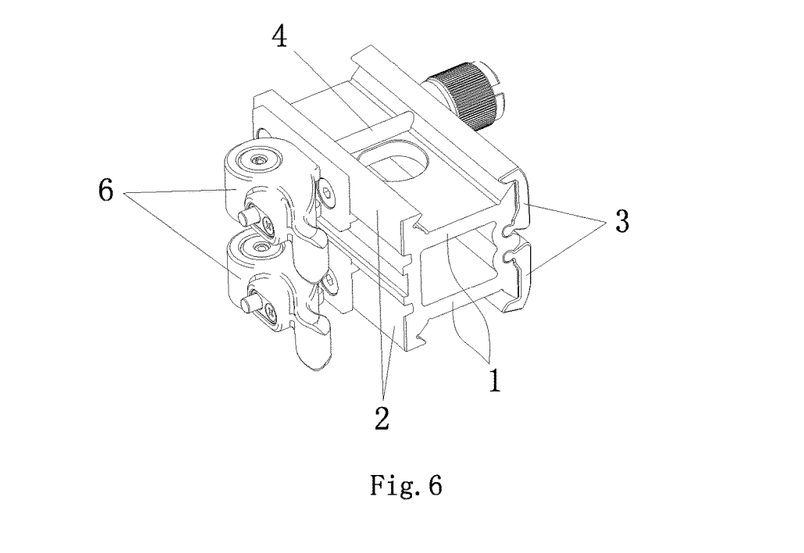
FIG. 6 is a structural schematic diagram of another embodiment of the present disclosure.
Figure 7:
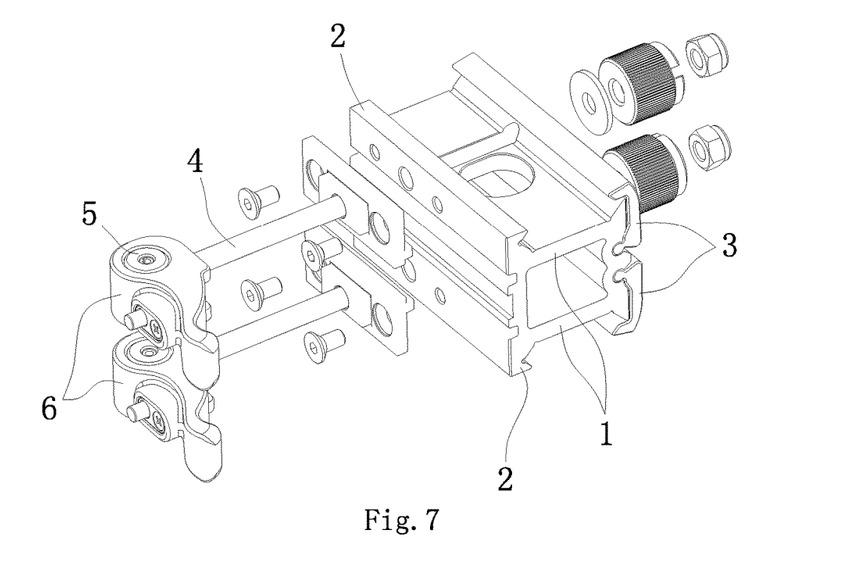
FIG. 7 is an exploded view of another embodiment of the present disclosure.
Figure 8:
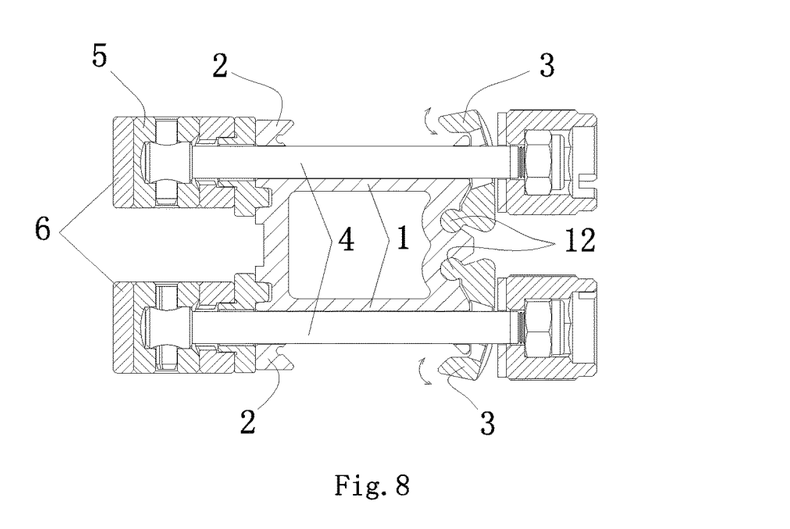
FIG. 8 is a main schematic cross-section diagram of FIG. 6.

FIG. 6 to FIG. 8 refer a quick locking device having two locking structures or bidirectional locking function according to another embodiment. The locking device comprises a fixing mount 1, and the fixing mount 1 is provided with two sets of the fixed pressing grooves 2 and the movable pressing grooves 3 that are relatively arranged in pair respectively. The pulling rod 4 that coordinates the fixed pressing groove 2 and the movable pressing groove 3, the pivot shaft 5, the cam lever 6, the reset spring 7, the locking guide rail 8 and other parts, are same as that of the embodiments above, which will not be repeatedly described. It shall be understood that in embodiments that are not shown in the drawings, the fixing mount 1 may be provided with multiple sets of the fixed pressing groove 2 and the movable pressing groove 3 oppositely arranged. Through arranging a pair of the fixed pressing groove 2 and the movable pressing groove 3 oppositely arranged on different surface of the fixing mount, the two mechanical components can be locked and connected according to different requirements, which enable free combinations or DIY between the components.

Although the present disclosure only describes embodiments of quick locking device of two pairs of fixed pressing grooves 2 and movable pressing grooves 3, and of one pair of fixed pressing groove 2 and movable pressing groove 3, respectively, according to the technical inspiration of the present disclosure, those skilled in the art can contemplate a quick locking device of three pairs of or more fixed pressing grooves 2 and movable pressing grooves 3, wherein each pair can be matched with a rotational positioning locking mechanism. Those skilled in the art can also contemplate that the fixed pressing groove 2 and the movable pressing groove 3 can be installed on various solid geometries.

Figure 9:
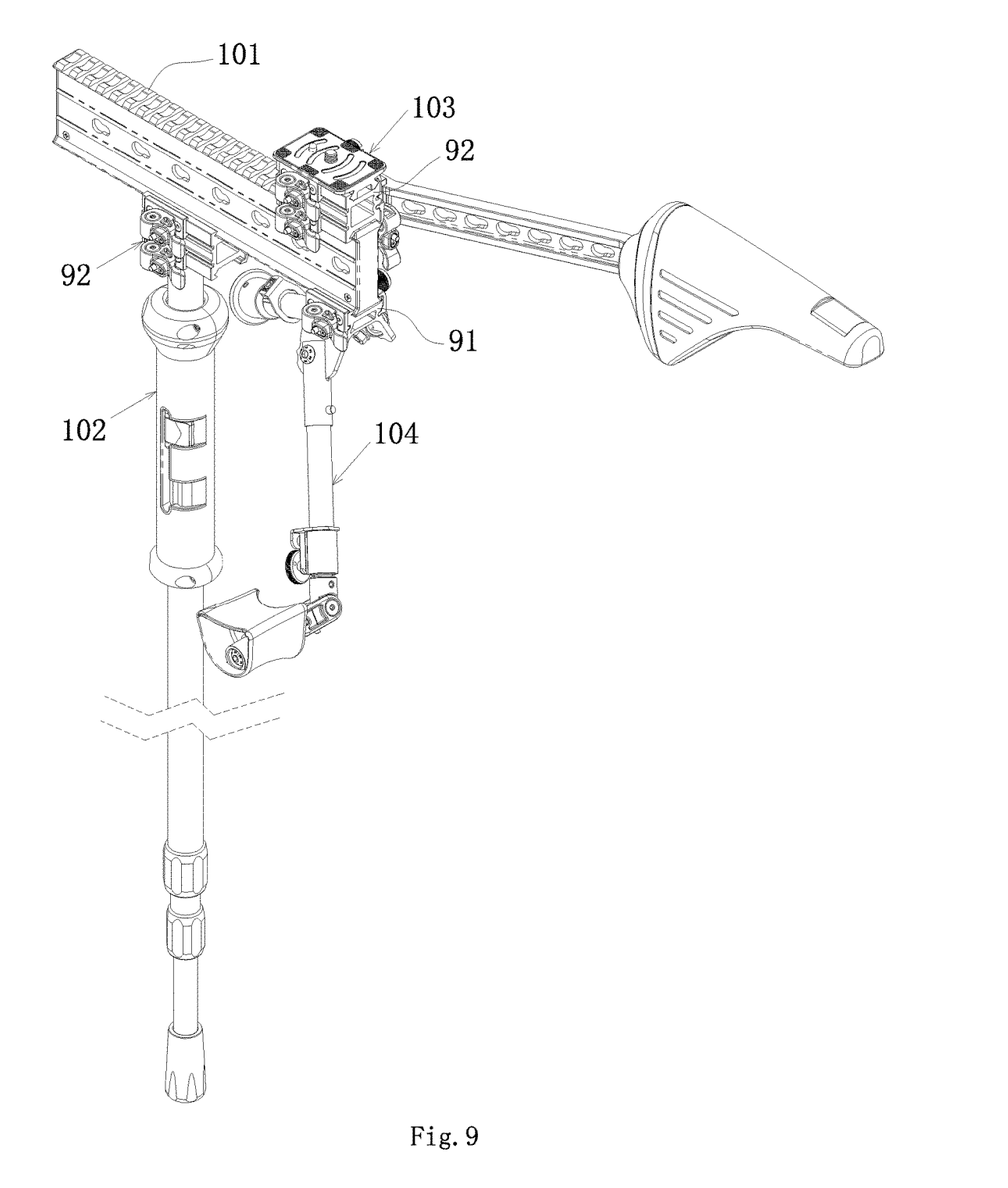
FIG. 9 is a diagram of the quick locking device of the present disclosure used in a mechanical assembly, such as a photographic equipment.

FIG. 9 illustrates the application of the quick locking device according to the present disclosure in a camera equipment. However, it shall be understood, the quick locking device according to the present disclosure can also be applied in various mechanical components and support frames to realize the quick locking.

In the embodiment of FIG. 9, the camera equipment comprises a main camera support 101, which is attached with a single-foot cane assembly 102, a quick loading plate assembly 103, an arm support 104, etc. The main camera support 101, the single-foot cane assembly 102 and quick loading plates of the quick loading plate assembly 103 are all provided with a Picatinny rail. The single-foot cane assembly 102, the quick loading plate assembly 103 and the arm support 104 can all be connected to the main camera support 101 through the quick locking devices 91 and 92, and a quick disassembly on the main camera support 101 can also be realized. Only the cam lever 6 needs to be pulled in locking or unlocking. That is, the cam lever 6 can drive the movable pressing grooves 3 to move, so as to easily realize locking and unlocking to the Picatinny rail. The operation is simple and quick, and the efficiency of the locking device is obviously increased. The arm support 104 can be locked to the bottom of the main camera support 101 through a first quick locking device 91 of single-clamping type. A second quick locking device 92 of the embodiment may have two pairs of fixed pressing grooves 2 and movable pressing grooves 3, so that the upper and lower positions of the second quick locking device 92 can both realize locking and connection, and it is easy to assemble the two components, such as the single-foot cane assembly 102 and the main camera support 101, the quick loading plate assembly 103 and the main camera support 101, which enable free combinations and DIY between components. In addition, the quick locking device described in the present disclosure can be universalized and standardized, it only needs to arrange a locking guide rail matched with the quick locking device on the member to be locked, which simplifies the connecting structure of each member, and the quick locking device is an independent part, and can be repeatedly used.

The embodiment shows the application of the quick locking device on the camera equipment, however it's not limited to such application. As mentioned before, according to the quick locking device of the present disclosure, because of wide applicability, the quick locking device can be applied to various mechanical devices, such as a frame member, an equipment, a component, a cloud deck mechanism, a support, etc., and in any application where supporting and assembly is needed.

Some of the embodiments of the present disclosure are described above, but the present disclosure is not limited to these embodiments, any equivalent or similar means reaching the technical effects of the present disclosure shall fall in the protection scope of the claims appended subsequently.

What is claimed is:

1. A quick locking device, comprising:
    a fixing mount comprising a fixed pressing groove;
    a movable member comprising a movable pressing groove arranged opposite to the fixed pressing groove on the fixing mount;
    a pulling rod connected to the fixed pressing groove and the movable pressing groove, so as to adjust an opening and a closing of the movable pressing groove;
    a pivot shaft;
    a cam lever pivotally connected to the pulling rod through the pivot shaft, wherein a rotation of the cam lever drives the pulling rod to move in an axial direction along its length, the pulling rod in turns drives the movable pressing groove to move oppositely to the fixed pressing groove, so as to adjust the opening or closing distance between the fixed pressing groove and the movable pressing groove; and
    a rotational positioning locking mechanism installed in the cam lever, wherein the rotational positioning locking mechanism comprises a positioning groove formed on the pivot shaft, a positioning member arranged in the cam lever and movably engaged with the positioning groove, and a locking operation member controlling a movement of the positioning member;
    wherein the pivot shaft is connected to the pulling rod, and the cam lever is provided with an installation hole to sleeve the pivot shaft;
    wherein the locking operation member is provided with an accommodating groove for containing the positioning member;
    wherein the locking operation member is configured to push and keep the positioning member to be clamped in the positioning groove, and the positioning groove restrict the rotation of the cam lever through the positioning member to cause locking; and
    when the locking operation member is operated, the positioning member falls in the accommodating groove to disengage from the positioning groove, such that the cam lever can rotate to cause unlocking.

2. The quick locking device according to claim 1, wherein the cam lever is internally provided with a first installation channel for installing the positioning member, a first end of the first installation channel is communicated with the pivot shaft, and a second end of the first installation channel is communicated with the locking operation member.

3. The quick locking device according to claim 1, wherein the positioning member is formed as:
    a sphere or a columnar spherical body;
    or
    an assembly composed of the columnar spherical body and the sphere, and is matched with the positioning groove, wherein one end of the sphere or the columnar spherical body is butted with the positioning groove, and the other end of the sphere or the columnar spherical body is butted with the locking operation member;
    or
    a geometry adapted to the positioning groove and the accommodating groove.

4. The quick locking device according to claim 3, wherein a side wall of the accommodating groove is configured as an arc-shaped plane or an inclined plane for pushing the positioning member to be clamped in the positioning groove.

5. The quick locking device according to claim 3, wherein the positioning groove is configured as a V-shape groove or a groove in different geometrical shapes.

6. The quick locking device according to claim 1, wherein the cam lever is provided with a second installation channel for installing the locking operation member; one end of the locking operation member is connected to a first end of an elastic member, and a second end of the elastic member is connected to a bottom of the second installation channel; the locking operation member cooperates with the elastic member to urge and clamp the positioning member into the positioning groove.

7. The quick locking device according to claim 6, wherein the locking operation member extends out from the second installation channel to form an operation end; and the elastic member is provided as a reset spring.

8. The quick locking device according to claim 1, wherein:
    the fixing mount is provided with a hinge groove for connecting the movable pressing groove, and the hinge groove includes a circular gap; and
    the movable pressing groove is provided with a spindle installable in the hinge groove so that the movable pressing groove can swing around the hinge groove through the spindle.

9. The quick locking device according to claim 8, wherein a reset spring is further arranged between the movable pressing groove and the fixing mount, and such reset spring enables the movable pressing groove to keep opened in case that the quick locking device is unlocked.

* * * * *